United States Patent
Le

(10) Patent No.: US 9,692,317 B2
(45) Date of Patent: Jun. 27, 2017

(54) POWER CONTROL CIRCUIT HAVING AN ERROR PREVENTION FUNCTION

(71) Applicant: ScienBiziP Consulting(Shenzhen) Co., Ltd., Shenzhen (CN)

(72) Inventor: Kun Le, Shenzhen (CN)

(73) Assignee: ScienBiziP Consulting(Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 14/794,300

(22) Filed: Jul. 8, 2015

(65) Prior Publication Data

US 2016/0204710 A1    Jul. 14, 2016

(30) Foreign Application Priority Data

Jan. 13, 2015    (CN) .......................... 2015 1 0015737

(51) Int. Cl.
*H02M 1/32* (2007.01)
*H02M 7/06* (2006.01)
*H02M 1/36* (2007.01)

(52) U.S. Cl.
CPC ............... *H02M 7/06* (2013.01); *H02M 1/36* (2013.01)

(58) Field of Classification Search
CPC ........ H02M 1/4208; H02M 1/32; H02M 7/00; H02M 7/12; H02M 7/04; H02M 7/217; H02M 5/4585
USPC .................. 363/50, 52, 53, 81, 84, 125, 126
See application file for complete search history.

(56) References Cited

U.S. PATENT DOCUMENTS

| | | | |
|---|---|---|---|
| 6,388,902 B1* | 5/2002 | Yasumura | H02M 3/3385 363/21.02 |
| 2003/0133315 A1* | 7/2003 | Lucas | H02M 1/36 363/49 |
| 2011/0134664 A1* | 6/2011 | Berghegger | H02M 1/36 363/49 |
| 2012/0033449 A1* | 2/2012 | Koch | H02M 1/36 363/15 |
| 2012/0140529 A1* | 6/2012 | Jin | H02M 3/073 363/21.12 |
| 2012/0163040 A1* | 6/2012 | Zhang | H02M 3/335 363/21.12 |
| 2013/0027999 A1* | 1/2013 | Ptacek | H02M 1/126 363/126 |
| 2014/0313787 A1* | 10/2014 | Chen | H02M 1/32 363/21.01 |

(Continued)

*Primary Examiner* — Adolf Berhane
(74) *Attorney, Agent, or Firm* — Steven Reiss

(57) ABSTRACT

A power control circuit includes a primary auxiliary winding, a startup module, a power control module, a rectifier module, and a clamping module. The primary auxiliary winding is configured to induce a voltage provided by a power circuit to generate an induced voltage. The startup module is configured to provide a startup voltage. The power control module is connected to the startup module and configured to output a control signal which controls the power circuit to supply power when the startup voltage input to the power control module is less than an upper threshold voltage. The rectifier module is connected to the primary auxiliary winding and configured to rectify the induced voltage generated by the primary auxiliary winding. The clamping module is connected between the rectifier module and the startup module is configured to clamp the induced voltage under the upper threshold voltage.

6 Claims, 2 Drawing Sheets

(56) References Cited

U.S. PATENT DOCUMENTS

| | | | |
|---|---|---|---|
| 2015/0029767 A1* | 1/2015 | Chou | H02M 3/00 |
| | | | 363/49 |
| 2015/0103567 A1* | 4/2015 | Wang | H02M 3/33592 |
| | | | 363/21.13 |
| 2016/0007417 A1* | 1/2016 | Gao | H05B 33/0815 |
| | | | 315/219 |
| 2016/0118905 A1* | 4/2016 | Freeman | H02M 3/33546 |
| | | | 363/21.1 |

* cited by examiner

POWER CONTROL CIRCUIT HAVING AN ERROR PREVENTION FUNCTION

CROSS-REFERENCE TO RELATED APPLICATIONS

This application claims priority to Chinese Patent Application No. 201510015737.5 filed on Jan. 13, 2015, the contents of which are incorporated by reference herein.

FIELD

The subject matter herein generally relates to power control circuit and, particularly, to a power control circuit having an error prevention function.

BACKGROUND

A power control circuit usually includes a power control module. The power control module connects to a power circuit and controls the power circuit to supply power by outputting a series of voltage pulses with a certain frequency to the power circuit. However, when a voltage source or a load in the power circuit is changed suddenly, a voltage input to the power control module will receive a voltage spike. If the voltage spike input to power control module is more than an upper threshold voltage, the power control module will be turned off due to over-voltage protection and stops outputting the series of voltage pulses with the certain frequency to the power circuit, therefore causing the power circuit to stop supplying power.

BRIEF DESCRIPTION OF THE DRAWINGS

Many aspects of the present disclosure are better understood with reference to the following drawing. The components in the drawing are not necessarily drawn to scale, the emphasis instead being placed upon clearly illustrating the principles of the present disclosure. Moreover, in the drawing, like reference numerals designate corresponding parts throughout the view.

DETAILED DESCRIPTION

Numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein.

The term "comprising" when utilized, means "including, but not necessarily limited to"; it specifically indicates open-ended inclusion or membership in the so-described combination, group, series and the like.

Embodiments of the present disclosure will be described with reference to the accompanying drawings.

Figure 1:
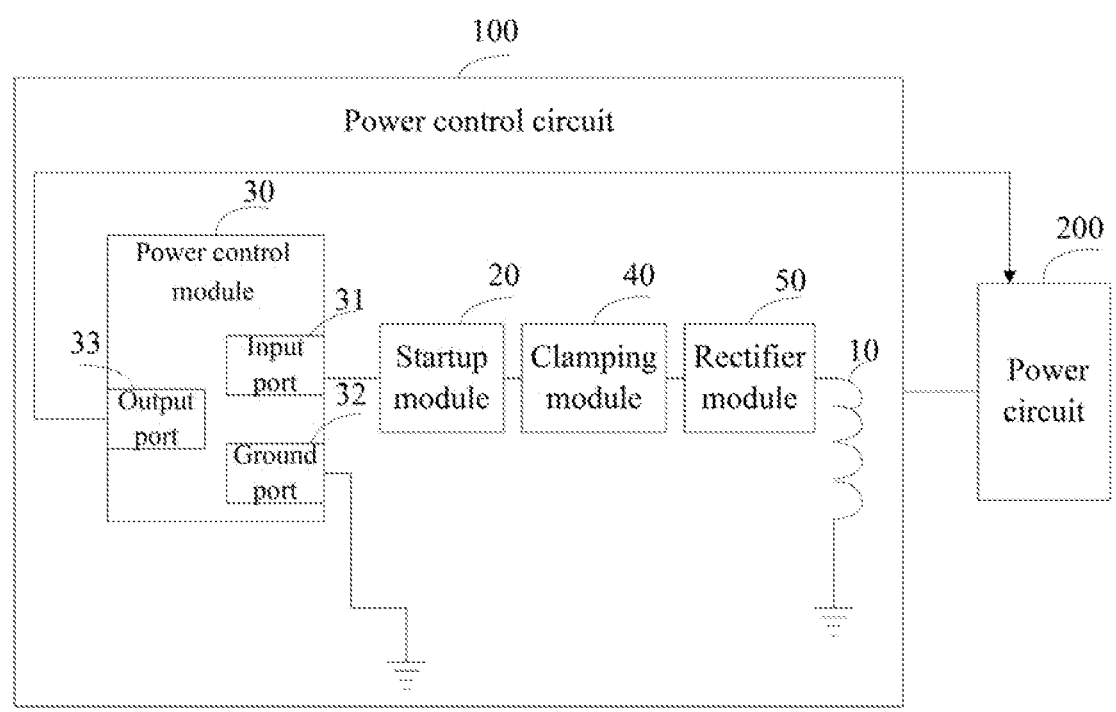
FIG. 1 is a block diagram of an example embodiment of a power control circuit for having an error prevention function.

FIG. 1 is a block diagram of an example embodiment of a power control circuit 100 having an error prevention function. The power control circuit 100 includes a primary auxiliary winding 10, a startup module 20, a power control module 30, a clamping module 40, and a rectifier module 50. The primary auxiliary winding 10 induces a voltage provided by a power circuit 200 to generate an induced voltage V.

The startup module 20 connects to the power control module 30 and provides a startup voltage to the power control module 30 to trigger the power control module 30 to work. The power control module 30 outputs a control signal to the power circuit 200 when the received startup voltage is less than an upper threshold voltage. The power circuit 200 supplies power in response to the control signal output by the power control module 30. In the embodiment, the control signal is a series of voltage pulses with a certain frequency. The rectifier module 50 connects to the primary auxiliary winding 10 and rectifies the induced voltage V generated by the primary auxiliary winding 10. The clamping module 40 is connected between the rectifier module 50 and the startup module 20. The clamping module 40 clamps the rectified voltage under the upper threshold voltage when the induced voltage V is greater than or equal to the upper threshold voltage.

Figure 2:
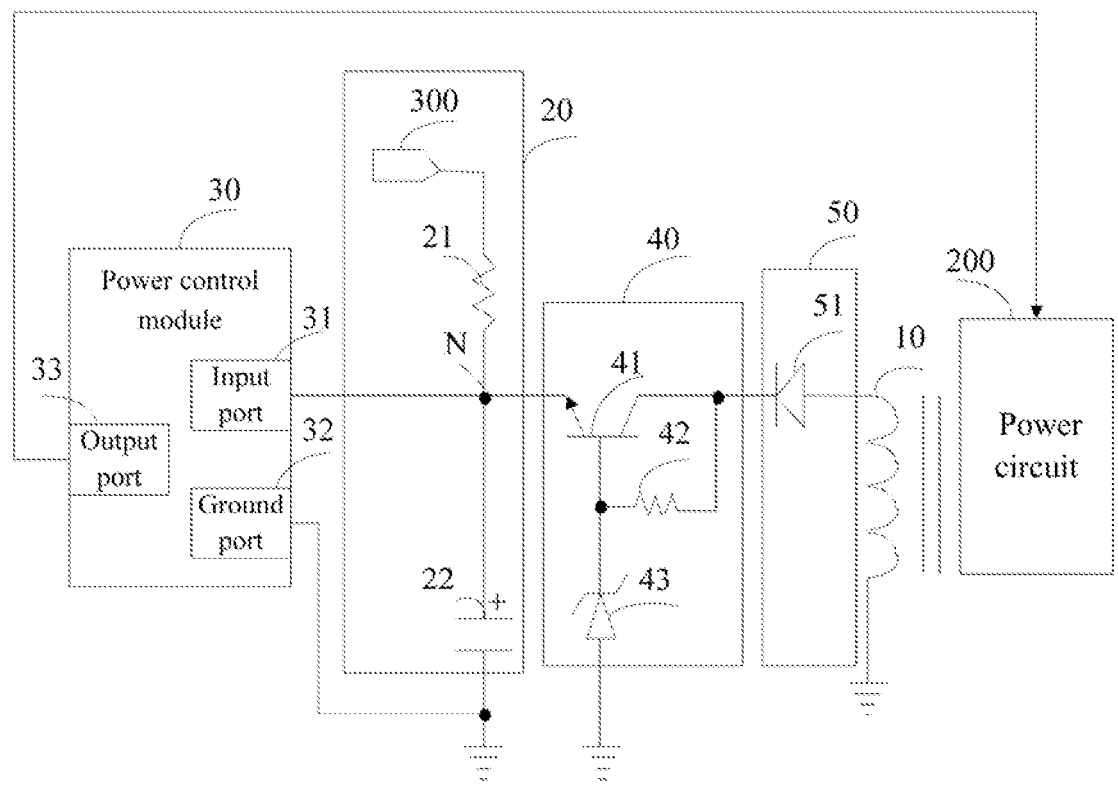
FIG. 2 is a circuit diagram of an example embodiment of the power control circuit of FIG. 1.

FIG. 2 is a circuit diagram of an example embodiment of the power control circuit 100 of FIG. 1. In detail, the power control module 30 includes an input port 31, a ground port 32, and an output port 33. The startup module 20 includes a startup resistor 21 and a startup capacitor 22. The startup resistor 21 and the startup capacitor 22 are connected between a power source 300 and ground in series. The power source 300 is used to supply power to the startup capacitor 22 via the startup resistor 21. A connection node N of the startup resistor 21 and the startup capacitor 22 constitutes an output port of the startup module 20 and outputs the startup voltage. In the embodiment, the startup capacitor 22 is an electrolytic capacitor, the voltage of the startup capacitor 22 is the startup voltage. The input port 31 of the power control module 30 connects to the connection node N, the output port 33 of the power control module 30 connects to the power circuit 200, and the ground port 32 of the power control module 30 is grounded. The power control module 30 starts to work when the voltage of the startup capacitor 22, namely the startup voltage is greater than or equal to a minimum working threshold voltage of the power control module 30.

The rectifier module 50 includes a rectifier diode 51. An anode of the rectifier diode 51 connects to one terminal of the primary auxiliary winding 10, the other terminal of the primary auxiliary winding 10 is grounded. The clamping module 40 includes a transistor 41, a biasing resistor 42, and a voltage regulator diode 43. A collector of the transistor 41 connects to a cathode of the rectifier diode 51, a base of the transistor 41 connects to a cathode of the voltage-regulator diode 43, an emitter of the transistor 41 connects to the connection node N. The biasing resistor 42 is connected between the cathode of the rectifier diode 51 and the cathode of the voltage regulator diode 43. An anode of the voltage regulator diode 43 is grounded. In the embodiment, the transistor 41 is a negative-positive-negative bipolar junction transistor.

In the embodiment, the output port 33 of the power control module 30 outputs the control signal to the power circuit 200 to control the power circuit 200 to supply power when the startup voltage received by the input port 31 of the power control module 30 is between the upper threshold voltage and the minimum working threshold voltage. The power control module 30 stops working and stops outputting the control signal to the power circuit 200 when the startup voltage received by the input port 31 is greater than or equal to the upper threshold voltage. Accordingly, the power circuit 200 stops supplying power when the control signal output by the power control module 30 is not received.

In the embodiment, the induced voltage generated by the primary auxiliary winding 10 is a voltage spike when a voltage source or a load in the power circuit 200 has a sudden change. The generated voltage spike is applied to the cathode of the voltage regulator diode 43 and the base of the transistor 41 via the biasing resistor 42, thus making the voltage regulator diode 43 work in a regulated state and the cathode of the voltage regulator diode 43 maintains a stable voltage V1. A base voltage of the transistor 41 is clamped at the stable voltage V1 and an emitter voltage of the transistor 41 is clamped at a voltage equal to a difference as V1−0.7 (volt). Therein, 0.7 volt is the emitter junction voltage of the transistor 41. Namely, the voltage of the input port 31 of the power control module 30 is clamped at V1−0.7 when the primary auxiliary winding 10 generates the voltage spike. By choosing the right stable voltage V1 of the voltage regulator diode 43, the value of V1−0.7 can be less than the upper threshold voltage, therefore, the voltage of the input port 31 of the power control module 30 can be less than the upper threshold voltage even though the primary auxiliary winding 10 generates the voltage spike. Namely, the power control module 30 is able to keep working when the primary auxiliary winding 10 generates the voltage spike.

In the embodiment, when the induced voltage V generated by the primary auxiliary winding 10 is not the voltage spike, the induced voltage V is far less than the voltage spike and the emitter voltage of the transistor 41 is V−0.3 (volt), therein, 0.3 volt is a voltage difference between the collector voltage and the emitter voltage of the transistor 41. Namely, the voltage of the input port 31 of the power control module 30 is equal to the induced voltage V subtracted 0.3, namely V−0.3. Obviously, V−0.3 is less than the upper threshold voltage due to V is not the voltage spike and far less than the voltage spike, therefore, the power control module 30 also keeps working when the induced voltage V generated by the primary auxiliary winding 10 does not occur the voltage spike.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. A power control circuit comprising:
    a primary auxiliary winding configured to induce a voltage provided by a power circuit to generate an induced voltage;
    a startup module configured to provide a startup voltage;
    a power control module connected to the startup module, configured to output a control signal which is configured to control the power circuit to supply power when the startup voltage input to the power control module is less than an upper threshold voltage, wherein the power control module comprises an input port, a ground port, and an output port, the startup module comprises a startup resistor and a startup capacitor, the startup resistor and the startup capacitor are connected between a power source and ground in series, a connection node of the startup resistor and the startup capacitor constitutes an output port of the startup module and outputs the startup voltage, the input port of the power control module connects to the connection node, the output port of the power control module is configured to connect to the power circuit, and the ground port of the power control module is grounded;
    a rectifier module connected to the primary auxiliary winding, configured to rectify the induced voltage generated by the primary auxiliary winding; and
    a clamping module connected between the rectifier module and the startup module configured to clamp the induced voltage under the upper threshold voltage.

2. The power control circuit according to claim 1, wherein the rectifier module comprises a rectifier diode, an anode of the rectifier diode connects to one terminal of the primary auxiliary winding, the other terminal of the primary auxiliary winding is grounded.

3. The power control circuit according to claim 2, wherein the clamping module comprises a transistor, a biasing resistor, and a voltage regulator diode, the collector of the transistor connects to a cathode of the rectifier diode, a base of the transistor connects to a cathode of the voltage regulator diode, an emitter of the transistor connects to the connection node, the biasing resistor is connected between the cathode of the rectifier diode and the cathode of the voltage regulator diode, a anode of the voltage regulator diode is grounded.

4. The power control circuit according to claim 3, wherein the transistor is a negative-positive-negative bipolar junction transistor.

5. The power control circuit according to claim 3, wherein when the induced voltage generated by the primary auxiliary winding is a voltage spike, the generated voltage spike is applied to the cathode of the voltage regulator diode and the base of the transistor via the biasing resistor, thus making the voltage regulator diode work in a regulated state and the cathode of the voltage regulator diode maintains a stable voltage, a base voltage of the transistor is clamped at the stable voltage and an emitter voltage of the transistor is clamped at a voltage equal to a difference voltage between the stable voltage and an emitter junction voltage of the transistor.

6. The power control circuit according to claim 1, wherein the startup capacitor is an electrolytic capacitor.

* * * * *